June 22, 1926.

E. FOSTER

SAW

Filed Nov. 28, 1922

1,589,799

INVENTOR

Edward Foster

By Philips Sawyer Rice Kerr

ATT'YS

Patented June 22, 1926.

1,589,799

UNITED STATES PATENT OFFICE.

EDWARD FOSTER, OF JAMAICA, NEW YORK, ASSIGNOR, BY MESNE ASSIGNMENTS, TO R. HOE AND CO., INC., OF NEW YORK, N. Y., A CORPORATION OF NEW YORK.

SAW.

Application filed November 28, 1922. Serial No. 603,747.

This invention relates to certain improvements in inserted tooth saws.

The invention has for its especial object the production of an inserted tooth saw in which the teeth or bits are positively locked in the blade so that liability of the bit to tip or rock sideways in the socket out of the cutting line is reduced to a minimum and the bit will hold a true course in the kerf.

It is a further object of the invention to produce such a construction which will be durable, and in which the bits are so formed and held in position that liability of breakage of the bits is reduced as compared with saws now in use.

With these and other objects not specifically referred to, the invention consists in certain novel parts, arrangements and combinations, which will be fully described in connection with the accompanying drawings, and the novel features then pointed out in the claim hereunto annexed.

Referring now to these drawings—

Figure 1:
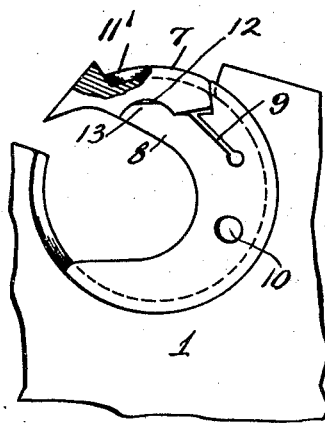
Figure 1 is a side view, partly in section and partly broken away, of a saw blade with the bit and holding shank partly in position in the socket.
Figure 2:
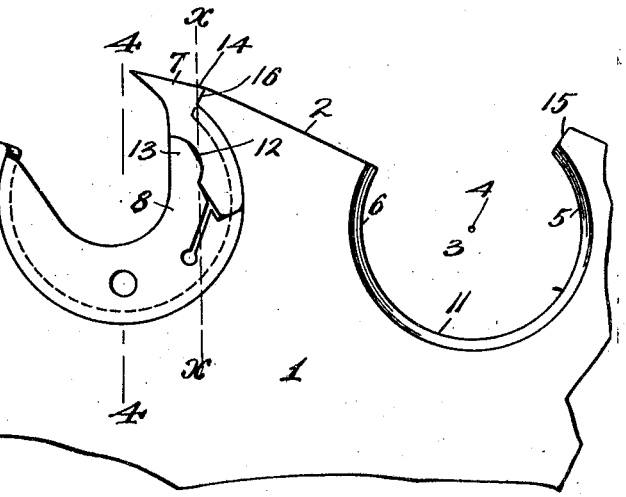
Figure 2 is a view similar to Fig. 1 showing the shank and bit in locked position, the figure showing an empty socket for the purpose of illustration.
Figure 3:
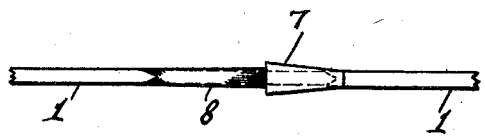
Figure 3 is a plan view of the bit and shank inserted in the blade looking in the direction of the arrow 3 of Fig. 2.
Figure 4:
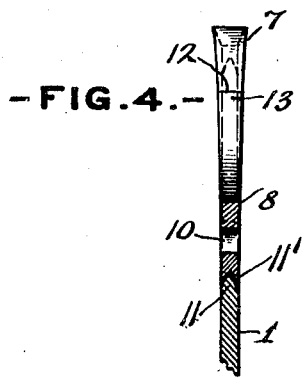
Figure 4 is a sectional view of an inserted shank and bit, the section being taken on line 4—4 of Fig. 2.

Referring now to these drawings, 1 illustrates a portion of a saw blade, this saw blade being provided with saw backs 2 between which are formed the sockets 3 in which the bits are held, these sockets being circular in shape struck from a center 4, and having an open side and forming back and front walls 5, 6, and these sockets are provided in the blade in any suitable or desired numbers.

The teeth or bits 7 are held in these sockets by shanks 8 having spring ends formed by slotting the shank as indicated at 9, and the shanks are provided with a hole 10 into which may be inserted a suitable tool for positioning the shanks and bits in the sockets. As usual, the sockets are formed with a rib 11 which fits into a groove 11' formed in the back of the tooth and the shank.

In accordance with the invention the shanks and bits are so formed and positioned in the sockets that a powerful wedging action is obtained between the shank and the back of the socket, so that a bit is positively locked in its socket and cannot tip or spring sideways and run out of the line of cut in any ordinary use of the saw. While this wedging or locking action may be effected in somewhat different ways, in the particular construction illustrated, this is effected by providing the shank with a locking head 13 which extends forward, in the direction of rotation of the saw, and upward, that is outward, so that it will intersect that radius of the socket which passes through the point of intersection of the socket circumference with the line of the shoulder 15. Furthermore, the curve of the upper surface of the locking head 13 where it abuts against the under side of the tooth 7, and the slope of the shoulder 15, are so arranged that an extension of the line of junction of the shoulder and the back of the tooth will intersect said curved upper surface of the locking head and will be approximately normal to said curved surface. By this construction the locking head is brought near to the end of the socket where it joins the shoulder and considerably forward of the radial line through the center of the saw and the shoulder, while at the same time the curve of the upper surface of the locking head is such as to offer an effective resistance to any downward thrust on the tooth at the plane of the shoulder surface. In other words, the locking head 13 can exert a strong reactive thrust at a diagonal to said radial line $x$—$x$ and thus prevents the bit or tooth from being sprung sidewise in case the cutting edge meets an unusual obstruction during the sawing operation.

In the present construction the bit 7 is provided with a recess or notch, indicated at 12, to receive the locking head 13 of the shank 8, the said recess or notch being shaped to conform generally to the curved surface of the locking head, this curve being generally a segment of a circle whose center is so located that the line of slope of the shoulder 15, if extended inward, would pass close to said center, when the bit is in its locked or operative position. By this arrangement the upper portion of the curved surface of the locking head 13 will offer an effective resistance to lateral displacing forces acting on the tooth and also effectively support the tooth against inward forces.

The upper end of the back forms a shoulder, and this shoulder is, as indicated at 15, sharply inclined, this inclination being such that the line of the face of the shoulder is almost a radius of the socket. The heel 14 of the bit is also angularly notched, as indicated at 16, to conform to the inclination of the shoulder. With this construction it results that the locking head of the shank can be brought into close proximity to the back, and the thrust of the locking head against the shoulder is almost on the radius of the socket, so that a very powerful wedging action is effected. The distance between the point of the shoulder and the locking head is so short that the tendency of the bit to lift when it strikes the work is overcome, and the bit is securely held against any rocking motion on the head and consequently the bit does not tend to move sidewise.

While the invention has been shown and described in what is believed to be its best form, it will be understood that certain changes and variations may be made in the specific structure illustrated without departing from the invention as defined in the claim appended hereto.

What I claim is:—

In an inserted tooth saw, the combination, with the saw-blade having a circular socket, having a back and shoulder, of a shank arranged to fit in and be rotated in said socket, said shank having a locking head provided with a curved surface, a bit having a saw tooth provided with a back arranged to abut against the said shoulder of the socket, and having a recess to receive the locking head, the locking head being positioned and arranged to intersect the radial line from the center of the socket to the intersection of the shoulder with the circumference of the socket, the upper part of the locking head and the slope of the shoulder being such that the line of said slope will intersect the locking head and will be substantially normal to said curved surface, substantially as described.

In testimony whereof, I have hereunto set my hand.

EDWARD FOSTER.